United States Patent Office 3,841,972
Patented Oct. 15, 1974

3,841,972
CONTROL OF FOAM DURING GROWTH OF A MICROORGANISM
Nai Yuen Chen, Titusville, N.J., Richard I. Leavitt, Morrisville, Pa., and Vernon F. Coty, Trenton, N.J., assignors to Mobil Oil Corporation
No Drawing. Filed Sept. 20, 1972, Ser. No. 290,689
Int. Cl. C12b 1/18
U.S. Cl. 195—107   22 Claims

ABSTRACT OF THE DISCLOSURE

This specification discloses a process for controlling the formation of foam in an agitated culture medium contained in a fermenter during growth of an aerobic microorganism. The culture medium contains an inoculum of the microorganism, an aqueous mineral salt nutrient, and a liquid hydrocarbon substrate and is in contact with an oxygen-containing gas. The formation of the foam is controlled by circulating the culture medium over a solid, unit body of a polymer. The solid, unit body has a minimum dimension of 0.001 inch and the polymer may be polyethylene, polypropylene, polybutylene, or polystyrene. The polymer has a molecular weight above 25,000.

BACKGROUND OF THE INVENTION

Field of the Invention

This invention relates to control of the formation of foam in a culture medium during growth of an aerobic microorganism on a liquid hydrocarbon substrate.

DESCRIPTION OF THE PRIOR ART

The growth of cells of an aerobic microorganism in an agitated culture medium contained in a fermenter and in contact with an oxygen-containing gas, the culture medium containing an inoculum of said microorganism, an aqueous mineral salt nutrient, and a liquid hydrocarbon substrate as a source of carbon for energy and growth of the microorganism, is known and various procedures have been proposed to control the formation of foam during such growth. For example, in the copending United States application of one of us and another, Ser. No. 856,198, filed Sept. 8, 1969, there is disclosed a process for inhibiting foaming in a liquid system containing water and a hydrocarbon, in which system a microorganism can be growing, comprising incorporating into the system particles of a solid, insoluble material, the particles having a surface area of less than 50 square meters per gram and having a portion of their surfaces occupied by polar sites, the material being poly-2,6-dimethyl-1,4-phenylene oxide, a copolymer of 2,6-dimethyl phenol and 2-methyl-1,6-tetradecyl phenol wherein the proportion of the 2-methyl-1,6-tetradecyl phenol does not exceed about 20 percent by weight of the copolymer, a copolymer of vinyl stearate and maleic anhydride, sublimed sulfur, silicon carbide, and polytetrafluoroethylene comminuted under cryogenic conditions.

A known defoamant composition for water-containing systems comprises polyethylene having a molecular weight of from about 500 to about 25,000 dispersed in a vehicle which may be a hydrocarbon. The size of the particles of polyethylene in the dispersion, it is believed, must be within a definite range, probably in the range of 0.1 micrometer.

U.S. Pat. No. 2,820,699 discloses an antifoaming substance for the digestion mixture comprising sulfuric acid and digestion catalysts employed in the Kjeldahl nitrogen determination. The antifoaming substance is polyethylene and is in the form of a sheet comprising an envelope for the digestion catalysts. The envelope containing the digestion catalysts is added to the sulfuric acid employed for digestion and both dissolve in the sulfuric acid.

U.S. Pat. No. 3,336,223 relates to an improved means for prolonging the useful life of an additive-containing lubricating oil. This is accomplished, as taught by the patentee, by incorporating the additive into a solid thermoplastic polymer and depositing this composition in the oil. Typical of the useful polymers are an ethylene-propylene copolymer having a molecular weight ranging from 200,000 to 300,000 and polyisobutylene ranging in molecular weight from 81,000 to 135,000.

In another patent, U.S. Pat. No. 3,340,194, there is disclosed a rolling oil provided by blending a straight distillate mineral oil with atactic polypropylene at a temperature in the range of 120–200° F.

U.S. Pat. No. 3,617,566, issued November 2, 1971, discloses the separation of oil from oil-containing water by contacting the oil-containing water with an absorbing material consisting mainly of atactic, non-crystalline polypropylene having a molecular weight of 10,000 to 100,000. The absorbing material may be contained in cylindrical bags knitted with polyethylene or polypropylene threads.

SUMMARY OF THE INVENTION

In accordance with the invention, formation of foam is controlled during growth of cells of an aerobic microorganism in an agitated culture medium contained in a fermenter and in contact with an oxygen-containing gas. The culture medium contains an inoculum of the microorganism, an aqueous mineral salt nutrient, and a liquid hydrocarbon substrate. Formation of foam is controlled by circulating the culture medium over a solid, unit body of a polymer. The solid, unit body has a minimum dimension of 0.001 inch and is a polymer having a molecular weight above 25,000. The polymer may be polyethylene, polypropylene, polybutylene, or polystyrene.

DESCRIPTION OF THE PREFERRED EMBODIMENTS

Attention has been directed to the growth of microorganisms upon a hydrocarbon substrate since the cells of the microorganisms obtained therefrom can provide a source of low cost, and easily obtainable, protein feed for animals and even for humans. In this procedure, an inoculum of the microorganism, the substrate, an aqueous mineral salt nutrient and an oxygen-containing gas form the culture medium. The culture medium is contained in a suitable type of fermenter and the culture medium is subjected to agitation during the growth operation. Agitation may be effected by rocking the fermenter, by propellers, or paddles, within the culture medium, by injection of the oxygen-containing gas into the culture medium or by any combination of these means. During the growth operation, foaming agents are naturally produced in the culture medium by action of the microorganisms on the hydrocarbon and the presence of the foaming agent during agitation of the culture medium results in the formation of a layer of foam on the surface of the culture medium. Foaming is deleterious for a number of reasons. For example, the portion of the culture medium represented by the foam is no longer subjected to the same degree of agitation as the portion represented by the remainder of the culture medium. Additionally, foaming can cause spillage or carryover from the fermenter. Further, it can cause gas locking of pumps employed for transportation of the culture medium from the fermenter. Moreover, the culture medium should often desirably contain additives such as surfactants and growth factors. However, certain of these additives aggravate the foaming of the culture medium. For this reason, these additives are often omitted from the culture medium whereas they would otherwise be employed. By the process of the invention, control of the formation of foam is readily and simply effected.

Control of the formation of foam is obtained by circulating the culture medium containing a liquid hydrocarbon over a solid, unit body of a polymer. The solid, unit body has a minimum dimension of 0.001 inch and is a polymer having a molecular weight above 25,000. The polymer may be polyethylene, polypropylene, polybutylene, or polystyrene. The polybutylene may be p. n-butylene or p. isobutylene. The polymer may also be expanded.

The solid, unit body may be in any desired form such as a filament or fiber, a plurality of filaments or fibers in the form of a bed, net, screen, or pad, or distinct shapes such as plates, spheres, rectangles, rings, etc. The solid, unit body may also be of indiscriminate shape such as obtained by grinding, crushing or otherwise breaking up a body of the polymer. The body has to be of a finite size and it has been found that where the minimum dimension of the body is at least 0.001 inch satisfactory results are obtained. For example, a filament or fiber having a diameter of 0.001 inch and any length greater than 0.001 inch may be employed.

To effect control of the formation of the foam, the culture medium must be circulated over the solid, unit body of the polymer. Circulation of the culture medium over the solid, unit body of the polymer may be effected by various means. Thus, circulation may be effected by movement of the culture medium relative to that of the solid, unit body of the polymer, by movement of the solid, unit body of the polymer relative to that of the culture medium, or by movement of both the culture medium and the solid, unit body of the polymer.

Movement of the culture medium relative to that of the unit body of the polymer may be effected by pumping or otherwise passing a stream of the culture medium over the solid, unit body. For example, a stream of the culture medium may be removed from the liquid body of the culture medium in the fermenter, passed through a bed, a net, a screen, or a pad of the polymer, and then returned to the liquid body of the culture medium. Thus, a bed, a net, a screen, or a pad of the polymer may be suspended in a stationary position at or above the surface of the culture medium and a stream of the culture medium pumped from the liquid body of the culture medium, over the solid, unit body of the polymer, and back into the liquid body of the culture medium. The culture medium may also be circulated over a stationary solid, unit body of the polymer by splashing or washing the culture medium over the solid, unit body. For example, a bed, a net, a screen, or pad of the polymer may be suspended at the surface of the culture medium and splashing or washing can be effected by agitation of the culture medium such as by stirring the culture medium or shaking the fermenter containing the culture medium.

Movement of the solid, unit body of the polymer relative to that of the culture medium may be effected by sweeping the solid, unit body of the polymer through the culture medium. The sweeping may be a back and forth movement either laterally or rotationally or may be a rotational movement in one direction of the solid, unit body of the polymer. For example, a stirrer may be formed of a net, or screen, or a pad of the polymer and the stirrer rotated backward and forward or in one direction only in the liquid body of the culture medium.

Movement of both the culture medium and the solid unit body of the polymer may be effected by a suitable combination of the procedures described above. For example, a net, a screen or a pad may be rotated or otherwise moved while a stream of the culture medium is pumped over it. Sweeping of the solid, unit body of the polymer through the culture medium will inherently effect simultaneous movement of the culture medium. Another way of effecting movement of both the culture medium and the solid, unit body of the polymer involves adding the solid, unit body of the polymer to the culture medium. The solid, unit body may be in the form of distinct or indiscriminate shapes and will float on the surface of the culture medium. A portion of the body depending upon its density relative to that of the culture medium, will be below the surface of the culture medium and a portion will be in the space above the culture medium. Under these conditions, simple agitation of the culture medium will move the culture medium by way of splashing or washing over the portion of the solid, unit body of polymer above the surface of the culture medium and will move the solid, unit body of the polymer about the surface of the culture medium.

Effective control of the formation of the foam is obtained where the culture medium is circulated over the solid, unit body of the polymer at a rate of at least 0.05 cubic centimeter of culture medium per hour per square centimeter of surface area of the solid, unit body of polymer. Preferably, however, the culture medium is circulated over the solid, unit body of the polymer at a rate of at least 5 cubic centimeters of culture medium per hour per square centimeter of surface area of the solid, unit body of polymer. Where difficulty may be encountered in determining the rate of circulation, as where the culture medium is splashed or washed over the solid, unit body of polymer, effective control of the formation of the foam is obtained by providing 0.01 to 10, but preferably 0.1 to 1, square centimeters of surface area of solid, unit body of the polymer for each cubic centimeter of the culture medium.

The invention is of particular advantage in that foam control is effected without contamination of the culture medium by an extraneous liquid component. The solid, unit body of the polymer is insoluble in the culture medium. At the end of the growth operation, the solid, unit body of polymer is readily separated from the culture medium.

In the process of the invention, the culture medium must contain a liquid hydrocarbon. Whereas both liquid and gaseous hydrocarbons can provide the carbon required for energy and growth of the microorganism, control of the formation of the foam by the process of the invention is dependent upon the presence in the culture medium of a liquid hydrocarbon. Stated otherwise, there is apparently a coaction between the liquid hydrocarbon substrate employed as a source of carbon for energy and growth of the microorganism and the unit body of the polymer. Where, as will be shown in Example 1, the culture medium does not contain a liquid hydrocarbon, control of the formation of foam cannot be effected employing the solid, unit body of the polymer.

The process of the invention is applicable to the growth of any aerobic microorganism capable of utilizing a liquid hydrocarbon as a source of carbon for energy and growth and included among the microorganisms are bacterial, fungi, yeasts, and molds.

Of the bacteria, suitable genera include Pseudomonas, Bacillus, Flavobacterium, Sarcina, etc. Illustrative species of these genera are *P. aeruginosa, P. oleovorans, P. putida, P. boreopolis, P. methanica, P. fluorescens, P. pyocyanea; B. aureus, B. acidi, B. subtilis, B. urici, B. cereus, B. coagulans, B. mycoides, B. circulans, B. megaterium; Flavobacterium aquatile; Sarcina alba, Sarcina lutea.*

Other preferred genera are Achromobacter and Nocardia, as illustrated by species such as *A. xerosis, A. agile, A. guttatus, A. superficialis, A. parvulus, A. cycloclastes; N. salmonicolor, N. asteroides, N. minimus, N. opaca, N. corallina, N. rubra,* and *N. paraffinae.* The genus Mycobacterium is useful, particularly such species as *M. parafficum, M. phlei, M. lacticola, M. rhodochrous, M. smegmatis, M. rubrum, M. luteum,* and *M. albus.*

Still other hydrocarbon-utilizing bacteria are *Methanomonas methanica* and *Methanomonas sp.*; *Micrococcus paraffinae; B. aliphaticum; B. hidium,* and *B. benzoli* from the genus Bacterium; and species of Micromonospora. Other useful genera include Brevibacterium, Aerobacter, and Corynebacterium.

Of the fungi, the process is applicable to any fungus within the classification Eumycetes or true fungi, but preferably from the classification Fungi Imperfecti or from the classification Phycomycetes. Preferred fungi from the classification Fungi Imperfecti are species of the genera Aspergillus and Penicillium, as illustrated by *A. niger, A. glaucus, A. oryzae, A. flavus, A. terreus, A. itaconicus; P. notatum, P. chrysogenum, P. glaucum, P. griseofulvum, P. expansum, P. digitatum, P. italicum*, etc. Other suitable microorganisms include various species of the genera Monilia, Helminthosporium, Alternaria, Fusarium, and Myrothecium. Preferred fungi of the class Phycomycetes include species from the genera Rhizopus and Mucor, such as *R. nigricans, R. oryzae, R. delemar, R. arrhizus, R. stolonifer, R. sp.; M. mucedo*, and *M. genevensis*.

Some of the foregoing genera of fungi are also characterized as molds, such as Aspergilius, Penicillium, Rhizopus, and Mucor, but it will be understood that all are true fungi or Eumycetes.

Of the yeasts, the preferred microorganisms are of the family Cryptococcaccae, and particularly of the subfamily Cryptococcoidae. Preferred genera are Torulopsis (or Torula) and Candida. Preferred species are *Candida lipolytica, Candida pulcherrima, Candida utilis, Candida utilis Variati major, Candida tropicalis, Candida intermedia;* and *Torulopsis colliculosa*. Other useful species are *Hansenula anomala,* and *Oidium lactus*. Also included are *Pichia polymorpha* and Trichosporan.

Various liquid hydrocarbon substrates may be employed. By "liquid" hydrocarbon substrate is meant a hydrocarbon that is utilizable by the microorganism as a source of carbon for energy and growth and is in the liquid phase at the temperature and pressure at which the growth procedure is carried out, i.e., the incubation temperature and pressure. Aliphatic hydrocarbons are preferred, and these may be saturated or unsaturated, straight or branched chain hydrocarbons having up to 20 or 30 or 40 or more carbon atoms. Saturated straight chain hydrocarbons having up to 20 carbon atoms are particularly desirable. Cyclic hydrocarbons, comprising aromatic and alicyclic compounds, are also of use, including alkyl-substituted cyclic compounds having 1, 2, or more alkyl substituents each of any suitable length, chain configuration, and degree of saturation, and in which the cyclic moiety is aromatic or cycloparaffinic. Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcyclopentane, the di- and trimethylcyclopentanes, the diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like, may be employed.

Crude oils, various petroleum fractions, residua, hydrocarbon derivatives such as from shale and coal, polymers containing synthetic olefins, etc. are of use.

It will be appreciated that normally solid hydrocarbon substrates may be used by dissolving them in a hydrocarbon solvent or in any other conventional inert non-toxic solvent. Where hydrocarbons are employed as a solvent, they themselves, as well as the solute, may be utilized as the substrate.

Hydrocarbon substrates that may be gaseous at the incubation temperature and pressure employed may be employed to augment the liquid hydrocarbon as a source of carbon for energy and growth of the microorganism. These hydrocarbons may be, for example, methane, ethane, propane, butane, and pentane. In using these gaseous hydrocarbons, they may be dissolved in the liquid hydrocarbon substrate.

The aqueous mineral salt nutrient comprises a source of nitrogen, such as a nitrate or a nitrite, ammonia or an ammonium salt, or urea, to produce the protein. It also comprises a source of such ions as potassium, magnesium, phosphate, and sulfate, as well as ions of trace elements like molybdenum, cobalt, etc., also required for growth of the microorganisms. Most, if not all, of these ions will usually be present in sufficient quantity in ordinary potable water. However, it is desirable to add the ions to the nutrient to ensure their presence in sufficient quantity for growth. A suitable aqueous mineral salt nutrient is as follows:

TABLE I

| | Grams/liter |
|---|---|
| Potassium monohydrogen phosphate | 6.0 |
| Sodium dihydrogen phosphate | 9.0 |
| Sodium molybdate | 0.006 |
| Cobaltic chloride | 0.006 |
| Magnesium sulfate | 0.6 |
| Ammonium sulfate | 6.0 |

Another suitable aqueous mineral salt nutrient is as follows:

TABLE II

| | Grams/liter |
|---|---|
| Sodium monohydrogen phosphate | 9.0 |
| Potassium dihydrogen phosphate | 6.0 |
| Ammonium sulfate | 6.0 |
| Magnesium sulfate | 0.6 |
| Sodium carbonate | 0.3 |
| Calcium chloride | 0.03 |
| Ferrous sulfate | 0.015 |
| Manganese sulfate | 0.006 |
| Cobaltic chloride | 0.006 |
| Sodium molybdate | 0.006 |

An oxygen-containing gas is introduced into the culture medium during the growth procedure. Ordinarily, this oxygen-containing gas is air although other oxygen-containing gases may be employed. Introduction of the oxygen-containing gas preferably is effected by injecting the oxygen-containing gas directly into the culture medium. However, introduction may also be effected by exposure of the surface of the culture medium to the oxygen-containing gas and agitating the culture medium so as to present an ever-changing surface to the oxygen-containing gas. Introduction of the oxygen-containing gas may be effected by using a trickling filter.

The introduction of the oxygen-containing gas serves primarily to provide the oxygen required for growth of the microorganisms. However, the introduction of the oxygen-containing gas may also serve other purposes. For example, the introduction of the oxygen-containing gas, where it is effected by injection directly into the culture medium, may serve to assist, or to provide the sole means, for agitating the culture medium to obtain the desired contact of the aqueous mineral salt nutrient, the substrate, the microorganism, and the oxygen-containing gas. The introduction of the oxygen-containing gas, further, may also serve to effect cooling of the culture medium depending upon its temperature relative to that of the culture medium and its water content relative to its water content at saturation at the temperature of the culture medium.

The growth procedure may be carried out at any temperature at which the microorganisms will grow. These temperatures will range between 20° C. and 55° C. Preferably, the growth reaction is carried out at a temperature between 30° C. and 40° C. If desired, or necessary, the culture medium may be cooled or heated to obtain the desired temperature. Cooling may be effected as a result of injection of the oxygen-containing gas, as mentioned above. If the oxygen-containing gas, for example, air, has an ambient temperature and humidity, i.e., degree of water saturation, such that its introduction into the culture medium will not affect cooling, its temperature or humidity, or both, may be lowered prior to introduction into the culture medium. Alternatively, cooling may be effected by other means such as by circulation of a cooling medium through a jacket or a cooling coil contacting the culture medium. Heating may be effected by means of an electrically heated jacket or other device contacting the culture medium. Automatic temperature control means, of conventional kind, may be used to maintain the desired temperature.

The growth procedure is carried out, as is well known in the art, at a suitable pH for the growth of the microorganism, the pH being in the range of 2.5 to 8.5, preferably 3.5 to 7.0, and adjustments can be made during the course of the growth procedure by addition to the culture medium of alkaline material, such as ammonia, or acidic material such as phosphoric, hydrochloric, or sulfuric acid.

The growth operation may be carried out as a batch reaction or a continuous reaction.

The following examples will be further illustrative of the invention.

Example 1

*Pichia polymorpha* was grown in a continuous operation in a 10-liter, air-lift fermenter. The fermenter was in the form of a U-tube connected to an upper chamber. The downcoming leg of the U-tube exited from the bottom wall of the chamber and the upcoming leg of the U-tube entered through the bottom wall of the chamber adjacent to the downcoming leg and extended upwardly to a point above the level of the culture medium in the chamber. An air sparger was fitted into the upcoming leg of the U-tube. Injection of air through the sparger effected circulation of the culture medium downwardly from the chamber through the downcoming leg of the U-tube and thence upwardly through the upcoming leg of the U-tube to return to the chamber. With the outlet of the upcoming leg of the U-tube being above the level of the culture medium in the chamber, the culture medium returning to the chamber spilled from the outlet of the upcoming leg of the U-tube to fall back and join the body of culture medium in the chamber.

In this example, the hydrocarbon substrate was n-hexadecane and the aqueous mineral salt nutrient had the composition given in Table I. The hexadecane, air and aqueous mineral salt nutrient were continuously added to the culture medium and a stream of culture medium effluent was continuously withdrawn from the fermenter. Foam formed at the surface of the culture medium and, with a yeast concentration of 9 grams per liter in the culture medium, the addition of 2-3 milliliters per hour of a 10% solution of a commercial, chemical antifoaming agent to the culture medium was required to control the formation of foam.

A commercially available polypropylene pad was positioned just above the surface of the culture medium and surrounding the upcoming leg of the U-tube. Growth of the yeast was continued, addition of the chemical antifoaming agent was discontinued, and the entire stream of culture medium spilling from the outlet of the upcoming leg of the U-tube splashed upon and passed through the pad before joining the body of culture medium in the chamber. Foaming was controlled for a period of three days under these conditions, the foam not rising above the lower surface of the pad. The supply of n-hexadecene to the culture medium was temporarily interrupted and, with depletion of the n-hexadecane in the culture medium by consumption by the yeast, foam build-up occurred. However, upon resumption of the supply of n-hexadecane, foam control was again established.

Foam control employing the polypropylene pad resulted in a decrease in the yeast concentration in the culture medium to 6 grams/liter. However, this decrease was later ascertained to be due to a substance toxic to the growth of yeast associated with the pad possibly through the use of materials in the production of the polypropylene or the fabrication of the polypropylene fibers constituting the pad or the fabrication of the pad from the fibers. Polypropylene fibers originally having a toxic effect on the growth of microorganism but washed successively with n-hexane, water, and n-hexadecane maintained their capacity to control foam but no longer had a toxic effect.

Example 2

Into each of four 50-milliliter shake flasks were placed 20 milliliters of an aqueous mineral salt nutrient having the composition given in Table I preceding and containing 1% by volume of n-hexadecene. The contents of each of the flasks were inoculated with *Pichia polymorpha*. To the contents of one of the flasks were added three 1-inch long, $\frac{1}{100}$-inch diameter polypropylene fibers. To the contents of one of the other flasks were added three 1-cubic millimeter pellets of polypropylene. To the contents of one other of the flasks were added three 5-millimeter diameter expanded polystyrene beads. The flasks were incubated at 36° C. by shaking for 24 hours in the presence of air. At the end of the incubation period, the foam height in each of the flasks was measured. The results are given in Table III.

TABLE III

| Flask No. | Additions | Foam height |
|---|---|---|
| 1 | No addition | 1 inch. |
| 2 | Polypropylene fibers | None. |
| 3 | Polypropylene pellets | Do. |
| 4 | Polystyrene beads | Do |

Example 3

*Candida lypolytica* were grown in a 10-liter air-lift fermenter, the fermenter being 10.2 centimeters in diameter and 310 centimeters in height and provided with a bubble-cap air sparger 15 centimeters from the bottom. The culture medium contained aqueous mineral salt nutrient having the composition given in Table I and containing 3% by volume of n-hexadecane. Air was injected into the culture medium at the rate of 72 liters per minute and the culture medium was maintained at a temperature of 36° C. and a pH of 3.2. After 24 hours of growth, the formation of foam was such that the foam was overflowing from the fermenter. The fermenter was then modified by the addition of a circulation pump which withdrew culture medium from the bottom of the fermenter and sprayed it on the layer of foam at a rate of 5–9 liters per minute. At first, the foam layer was reduced to the point that foam no longer overflowed from the fermenter. However, as the cells in the culture medium reached a concentration of about 10 grams of dry cells per liter, the foam increased in viscosity and overflowed from the fermenter. Thereafter, a polypropylene pad, 10-centimeters in diameter, 3-centimeters thick, and made of woven fibers having a diameter of 0.3 millimeter, was positioned 90 centimeters from the surface of the fermenter and the culture medium sprayed over it at the above-mentioned rate. The foaming problem was eliminated.

Example 4

A 5-liter fermenter was fitted with a vertical draft tube extending one inch from the bottom of the fermenter to the midpoint thereof and with a stirrer consisting of a pair of propellers on a single shaft, one propeller near the bottom of the fermenter and the other at a point about midway between the top and the bottom of the fermenter. Aqueous mineral salt nutrient having the composition given in Table I and containing 3% by volume of n-hexadecane in the amount of 2.5 liters was placed in the fermenter. With this amount of aqueous mineral salt nutrient the upper propeller was at the surface of the nutrient. The contents of the fermenter were inoculated with *Pichia polymorpha*. Growth of the yeast was carried out with air injection at a rate of 4.5 liters of air per minute, a temperature of 36° C., and the propellers being rotated at 700 revolutions per minute. After 24 hours, growth was stopped because of excessive foaming.

The growth procedure described above was repeated except that the upper propeller was wrapped with a net of woven fibers of polypropylene having a diameter of 0.01 inch. With rotation of the propellers and with the upper propeller being at the surface of the culture medium, the culture medium washed over the upper propeller and any foam that might form would be in contact with the propeller. No foam was detectable during the growth of the yeast.

We claim:

1. In a process for the growth of cells of an aerobic microorganism in an agitated culture medium contained in a fermenter and in contact with an oxygen-containing gas, said culture medium containing an inoculum of said microorganism, an aqueous mineral salt nutrient, and a liquid hydrocarbon substrate, the improvement for controlling the formation of foam in said culture medium during growth of said cells of said microorganism comprising circulating said culture medium over a solid, unit body having a minimum dimension of 0.001 inch of a polymer having a molecular weight above 25,000 selected from the group consisting of polyethylene, polypropylene, polybutylene, and polystyrene, said solid, unit body being in the form of a filament, a distinct shape, or an indiscriminate shape.

2. The process of claim 1 wherein said polymer is polyethylene.

3. The process of claim 1 wherein said polymer is polypropylene.

4. The process of claim 1 wherein said polymer is polybutylene.

5. The process of claim 1 wherein said polymer is polystyrene.

6. The process of claim 1 wherein said solid, unit body is in the form of a filament.

7. The process of claim 1 wherein said solid, unit body is in the form of a bed.

8. The process of claim 1 wherein said solid, unit body is in the form of a net.

9. The process of claim 1 wherein said solid, unit body is in the form of a screen.

10. The process of claim 1 wherein said solid, unit body is in the form of a pad.

11. The process of claim 1 wherein said culture medium is circulated over said solid, unit body by removing a stream of said culture medium from said fermenter, passing said stream of said culture medium over said solid, unit body, and returning said stream of said culture medium to said fermenter.

12. The process of claim 1 wherein said culture medium is circulated over said solid, unit body by suspending said solid, unit body at the surface of said culture medium, removing a stream of said culture medium from said fermenter, passing said stream of said culture medium over said solid, unit body, and returning said stream of said culture medium to said fermenter.

13. The process of claim 12 wherein said solid, unit body is in the form of a pad.

14. The process of claim 1 wherein said culture medium is circulated over said solid, unit body by suspending said solid, unit body above the surface of said culture medium, removing a stream of said culture medium from said fermenter, passing said stream of said culture medium over said solid, unit body, and returning said stream of said culture medium to said fermenter.

15. The process of claim 14 wherein said solid, unit body is in the form of a pad.

16. The process of claim 1 wherein said culture medium is circulated over said solid, unit body by adding said solid, unit body to said culture medium and agitating said culture meium.

17. The process of claim 1 wherein said culture medium is circulated over said solid, unit body at a rate of at least 0.05 cubic centimeter of said culture medium per hour per square centimeter of surface area of said solid unit body.

18. The process of claim 1 wherein said culture medium is circulated over said solid, unit body at a rate of at least 5 cubic centimeters of said culture medium per hour per square centimeter of surface area of said solid, unit body.

19. The process of claim 16 wherein said solid, unit body is added to said culture medium to provide 0.01 to 10 square centimeters of surface area of said solid, unit body for each cubic centimeter of said culture medium.

20. The process of claim 16 wherein said solid, unit body is added to said culture medium to provide 0.1 to 1 square centimeter of surface area of said solid, unit body for each cubic centimeter of said culture medium.

21. In a process for the growth of cells of *Pichia polymorpha* in an agitated culture medium contained in a fermenter and in contact with an oxygen-containing gas, said culture medium containing an inoculum of said *Pichia polymorpha*, an aqueous mineral salt nutrient, and a liquid hydrocarbon substrate to provide carbon required for energy and growth of said *Pichia polymorpha*, the improvement for controlling the formation of foam during growth of said cells of said *Pichia polymorpha* comprising circulating said culture medium over a pad of fibers of polypropylene at a rate of at least 0.05 cubic centimeter of culture medium per hour per square centimeter of surface area of said pad, said fibers of polypropylene having a minimum dimension of 0.001 inch and said polypropylene having a molecular weight above 25,000.

22. In a process for the growth of cells of *Candida lipolytica* in an agitated culture medium contained in a fermenter and in contact with an oxygen-containing gas, said culture medium containing an inoculum of said *Candida lipolytica*, an aqueous mineral salt nutrient, and a liquid hydrocarbon substrate to provide carbon required for energy and growth of said *Candida lipolytica*, the improvement for controlling the formation of foam during growth of said cells of said *Candida lipolytica* comprising circulating said culture medium over a pad of fibers of polypropylene at a rate of at least 0.05 cubic centimeter of culture medium per hour per square centimeter of surface area of said pad, said fibers of polypropyene having a minimum dimension of 0.001 inch and said polypropylene having a molecular weight above 25,000.

References Cited

UNITED STATES PATENTS 3,730,894  5/1973  Heilweil et al. _____ 195—107

A. LOUIS MONACELL, Primary Examiner

R. J. WARDEN, Assistant Examiner

U.S. Cl. X.R.

252—321

UNITED STATES PATENT OFFICE
CERTIFICATE OF CORRECTION

Patent No. 3,841,972  Dated October 15, 1974

Inventor(s) N.Y. CHEN, R.I. LEAVITT and V. F. COTY

It is certified that error appears in the above-identified patent and that said Letters Patent are hereby corrected as shown below:

| | |
|---|---|
| Column 4, line 53 | "terial" should be --teria--. |
| Column 5, line 52 | Before "the diethylcyclopentanes", insert --ethylcyclopentane,--. |
| Column 10, claim 16 | The last word should be --medium--. |
| Column 10, claim 22 line 52 | "polypropyene" should be --polypropylene--. |

Signed and sealed this 31st day of December 1974.

(SEAL)
Attest:

McCOY M. GIBSON JR.
Attesting Officer

C. MARSHALL DANN
Commissioner of Patents